(12) United States Patent
Ungstrup et al.

(10) Patent No.: US 9,875,753 B2
(45) Date of Patent: Jan. 23, 2018

(54) HEARING AID AND A METHOD FOR IMPROVING SPEECH INTELLIGIBILITY OF AN AUDIO SIGNAL

(71) Applicant: Widex A/S, Lynge (DK)

(72) Inventors: Michael Ungstrup, Allerod (DK); Mike Lind Rank, Farum (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 14/671,329

(22) Filed: Mar. 27, 2015

(65) Prior Publication Data

US 2015/0199977 A1 Jul. 16, 2015

Related U.S. Application Data

(63) Continuation-in-part of application No. PCT/EP2012/076407, filed on Dec. 20, 2012.

(51) Int. Cl.

| | |
|---|---|
| *G10L 13/00* | (2006.01) |
| *G10L 21/02* | (2013.01) |
| *H04R 25/00* | (2006.01) |
| G10L 21/0364 | (2013.01) |
| G10L 15/26 | (2006.01) |
| G10L 15/30 | (2013.01) |

(52) U.S. Cl.
CPC .......... *G10L 21/0205* (2013.01); *G10L 13/00* (2013.01); *H04R 25/55* (2013.01); *H04R 25/554* (2013.01); *G10L 15/26* (2013.01); *G10L 15/30* (2013.01); *G10L 21/0364* (2013.01); *H04R 2225/43* (2013.01)

(58) Field of Classification Search
USPC .............. 704/251, 252, 258, 260, 270–271
See application file for complete search history.

(56) References Cited

U.S. PATENT DOCUMENTS

| | | | |
|---|---|---|---|
| 5,657,426 A | 8/1997 | Waters et al. | |
| 6,377,925 B1 | 4/2002 | Greene, Jr. et al. | |
| 6,546,082 B1* | 4/2003 | Alcendor ............. | H04Q 3/0029 379/52 |
| 7,676,372 B1* | 3/2010 | Oba ...................... | G09B 21/009 434/169 |

(Continued)

FOREIGN PATENT DOCUMENTS

| | | |
|---|---|---|
| WO | 99/43185 A1 | 8/1999 |
| WO | 2007/025569 A1 | 3/2007 |
| WO | 2007/112737 A1 | 10/2007 |

*Primary Examiner* — Leonard Saint Cyr
(74) *Attorney, Agent, or Firm* — Sughrue Mion, PLLC

(57) ABSTRACT

A system for improving speech intelligibility of an audio signal, comprises a hearing aid (10), a server (71), and an external device (50)—such as a smartphone or a tablet computer. The hearing aid has a short range transceiver. The server is accessible via the Internet, and has a Speech Recognition Engine converting speech into text. The external device has a short range transceiver for communication with said hearing aid, a second transceiver for providing a wireless data connection to said server via the Internet, means for handling a speech stream intended for the hearing aid, and a Text-To-Speech engine adapted to synthesize speech based on a string of text. The invention also provides a method of improving speech intelligibility of an audio signal.

20 Claims, 4 Drawing Sheets

(56) References Cited

U.S. PATENT DOCUMENTS

| | | | |
|---|---|---|---|
| 8,396,224 B2* | 3/2013 | Dittberner | H04R 25/40 381/23.1 |
| 8,825,149 B2* | 9/2014 | Kraus | A61B 5/743 600/545 |
| 2003/0069997 A1 | 4/2003 | Bravin et al. | |
| 2008/0040116 A1 | 2/2008 | Cronin et al. | |
| 2012/0197153 A1* | 8/2012 | Kraus | A61B 5/743 600/545 |
| 2012/0215532 A1 | 8/2012 | Foo et al. | |

* cited by examiner

HEARING AID AND A METHOD FOR IMPROVING SPEECH INTELLIGIBILITY OF AN AUDIO SIGNAL

RELATED APPLICATIONS

The present application is a continuation-in-part of application PCT/EP2012076407, filed on Dec. 20, 2012, in Europe, and published as WO 2014094858 A1.

BACKGROUND OF THE INVENTION

1. Field of the Invention

The present invention relates to hearing aids. As used throughout this application including its appended claims, a "hearing aid" is a device having an input for providing a sound signal representing a sound to be heard by a user, a processor for processing the sound signal so as to compensate for a hearing impairment of the user, and a speaker for reproducing the compensated sound into the ear of the user. The invention, more particularly, relates to a hearing aid to fit into or to be worn behind the wearer's ear. The present invention further relates to an external device handling a speech stream intended for the hearing aid, and how to improve speech intelligibility of the audio signal. The invention also relates to a method of improving speech intelligibility of an audio signal.

2. The Prior Art

Modern, digital hearing aids comprise sophisticated and complex signal processing units for processing and amplifying sound according to a prescription aimed at alleviating a hearing loss for a hearing impaired individual. Furthermore, connectivity is an important issue for modern digital hearing aids. Advanced hearing aids may have means for interconnection which offers the advantages that timing and relative signal strength of an audio signal received by the microphones provides valuable information about the audio signal source. Furthermore, hearing aids have been able to receive telecoil signals for many years, and this technology has been regulated by the ITU-T Recommendation P.370. Several hearing aid manufacturers have developed each their own proprietary wireless communication standard with external devices for wireless streaming of audio signals in an electromagnetic carrier from e.g. a television via the external device.

Hearing aids have commonly been stand-alone devices, where the main purpose has been to amplify the surrounding sound for the user. However, there has been a significant development within smartphones and Internet access via these smartphones. Recently, the Bluetooth Core Specification version 4.0—also known as Bluetooth Low Energy— has been adopted, and since then, there has been developed various chipsets having a size and a power consumption falling within the capabilities of hearing aids, whereby it has become possible to connect a hearing aid to the Internet and get the benefit from such a connection.

SUMMARY OF THE INVENTION

The purpose of the invention is to improve speech intelligibility of the audio signal handled in an external device for later streaming into the hearing aid.

The invention, in a first aspect, provides a system for improving speech intelligibility of an audio signal, comprising a hearing aid having a speaker to output said audio signal into an ear of a user, a short range transceiver; a server accessible via the Internet, and having a Speech Recognition Engine converting speech into text; an external device having a short range transceiver for communication with said hearing aid, a second transceiver for providing a wireless data connection to said server accessible via the Internet, means for handling a speech stream intended for the hearing aid, and a Text-To-Speech engine adapted to synthesize speech based on a string of text; wherein said external device further comprises means for selectively streaming said speech stream intended for the hearing aid to said server via said second transceiver for converting said speech stream into a string of text, means for receiving said string of text via said second transceiver, and for providing said string of text as input to said Text-To-Speech engine, and means for forwarding the synthetized speech signal to said hearing aid via said short range transceiver.

By processing an audio stream by recognizing speech (speech to text) and afterwards synthetizing voice (text to speech) again, it is obtained that idiosyncratic speech artifacts (e.g. if the speaker is babbling) are removed from the spoken speech. However, the Speech Recognition process is extremely complex, and there is a challenging learning curve for each individual speaker (and actually also for the automatic speech recognition system as such), and if the speaker furthermore has a foreign language as mother tongue, has idiosyncratic speech artifacts, or uses a lot of fillers, the Speech Recognition process requires a significant processing power. A system according to the invention will be beneficial when the processed audio is picked up in noisy environments, e.g. in a car. By placing the Speech Recognition in a remote server accessible via the Internet, it is possible to employ sufficient processing power in order to keep the error rate of the Speech Recognition engine sufficiently low for practical use. Applying an external device— as a smartphone or a tablet computer—for the system communication, it is possible to limit the delay of the system sufficiently to be useful in handling audio streams in education, churches, television etc.

According to the preferred embodiment the Text-To-Speech engine of the external device may synthetize the audio stream according to the hearing loss of the user by applying a frequency dependent gain compensating for the hearing loss of the user and/or by applying linear frequency transposition.

The invention, in a second aspect, provides an external device for use in a system for improving speech intelligibility of an audio signal to be output into an ear of a user by means of a speaker of a hearing aid, and comprising a short range transceiver for communication with said hearing aid, means for handling a speech stream intended for the hearing aid, a second transceiver for providing a wireless data connection to a server having a Speech Recognition Engine converting speech into text, a Text-To-Speech engine adapted to synthesize speech based on a string of text, means for forwarding the synthetized speech signal to said hearing aid via said short range transceiver, said second transceiver being adapted for selectively streaming said speech stream intended for the hearing aid to said server, and said second transceiver being adapted to receive said string of text, and to provide said string of text as input to said Text-To-Speech engine.

The invention, in a third aspect, provides a method for improving speech intelligibility of an audio signal, and comprising the steps of handling a speech stream intended for the hearing aid, selectively streaming said speech stream via a wireless connection to a remote server having a Speech Recognition engine for converting said speech stream into a string of text, receiving said string of text via said wireless connection, providing said string of text as input to a Text-To-Speech engine, synthesizing a speech signal based on a string of text in said Text-To-Speech engine, and forwarding the synthetized speech signal to said hearing aid via said short range transceiver.

The invention, in a fourth aspect, provides a computer-readable storage medium having computer-executable instructions, which when executed in a mobile communication device perform actions when an audio stream is handled as input in said mobile communication device and intended for the hearing aid, comprising providing a software application including a Text-To-Speech engine, handling a speech stream intended for the hearing aid, selectively streaming said speech stream intended for the hearing aid via a wireless connection of said mobile communication device to a remote server having a Speech Recognition engine for converting said speech stream into a string of text, receiving said string of text via said wireless connection, synthesizing a speech signal based on a string of text in said Text-To-Speech engine, and forwarding the synthetized speech signal to said hearing aid via said short range transceiver.

BRIEF DESCRIPTION OF THE DRAWINGS

The invention will be described in further detail with reference to preferred embodiments and the accompanying drawings, in which.

DETAILED DESCRIPTION

Figure 1:
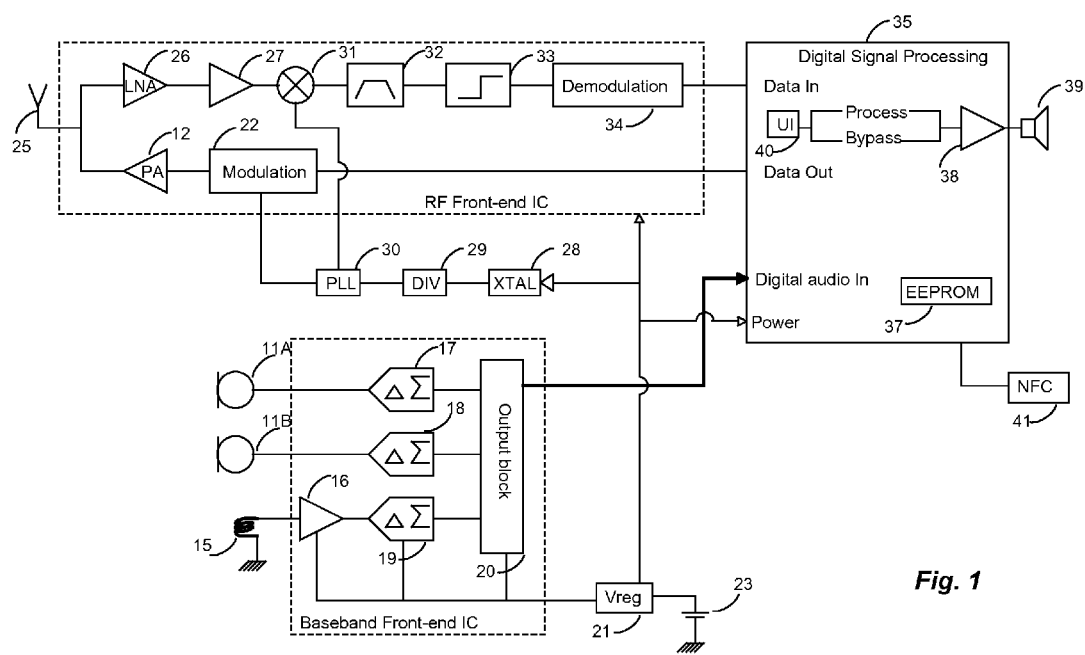
FIG. 1 illustrates schematically a first embodiment of a hearing aid according to the invention.

Reference is made to FIG. 1, which schematically illustrates a hearing aid 10 according to a first embodiment of the invention. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit.

On the input side, the hearing aid 1 comprises an analog frontend chip receiving input from two acoustical-electrical input transducers 11A, 11B for picking up the acoustic sound and a telecoil 15. The output from the telecoil 15 is led to an amplifier 16 intended for amplification of low level signals. The output from the two acoustical-electrical input transducers 11A, 11B and the amplifier 16 is led to respective Delta-Sigma converters 17-19 for converting the analog audio signals into digital signals. A serial output block 20 interfaces towards the Digital Signal Processing stage and transmits data on the positive edge of the clock input from a clock signal derived from a crystal oscillator (XTAL) 28 and divided by divider 29.

The hearing aid 10 has a standard hearing aid battery 23 and a voltage regulator 21 ensuring that the various components are powered by a stable voltage regardless of the momentary voltage value defined by the discharging curve of the battery 23.

The RF part of the hearing aid 10 includes a Bluetooth™ antenna 25 for communication with other devices supporting the same protocol. Bluetooth™ is a wireless technology standard for exchanging data over short distances (typically less than 10 m), operating in the same spectrum range (2402-2480 MHz) as Classic Bluetooth technology, which operates with forty 2 MHz wide channels. The modulation of Bluetooth Low Energy is based upon digital modulation techniques or a direct-sequence spread spectrum. Bluetooth Low Energy is intended to fulfill the needs for network connection for devices where the average power (energy) consumption is the major issue, and it is aimed at very low power (energy) applications running off a coin cell. Bluetooth Core Specification version 4.0 is an open standard and this specification is the currently preferred one. However other standards may be applicable if a wide availability and low power consumption is present.

The Bluetooth Core System consists of an RF transceiver, baseband (after down conversion), and protocol stack (SW embedded in a dedicated Bluetooth™ Integrated Circuit. The system offers services that enable the connection of devices and the exchange of a variety of classes of data between these devices.

The antenna 25 may according to the first embodiment be a micro-strip antenna having an antenna element having the length corresponding to a quarter of wavelength which is approximately 3.1 cm. The antenna 25 may be selected from a great variety of antenna types including e.g. meander line antennas, fractal antennas, loop antennas and dipole antennas. The antenna may be fixed to the inner wall of the hearing aid housing, and may have bends and curvatures to be contained in the hearing aid housing. The RF signal picked up by the antenna 25 is led to the Bluetooth™ Integrated Circuit and received by a low-noise amplifier (LNA) 26 which is designed to amplify very weak signals. The low-noise amplifier 26 is a key component which is placed at the front-end of a radio receiver circuit, and the overall noise figure (NF) of the receiver's front-end is dominated by the first few stages. A preamplifier (Preamp) 27 follows immediately after the low-noise amplifier 26 to reduce the effects of noise and interference and prepares the small electrical signal for further amplification or processing.

The crystal oscillator (XTAL) 28 uses the mechanical resonance of a piezoelectric material to create an electrical resonance signal with a very precise frequency. The divider 29 dividing this electrical resonance signal may output appropriate stable clock signals for the digital chipsets of the hearing aid, and to stabilize frequencies for the up and down conversion of signals in the RF block of the hearing aid. The signal with stabilized frequency from the divider 29 is via a phase lock loop (PLL) 30 fed as input to a mixer 31, whereby by the received RF signal is converted down to an intermediate frequency. Hereafter a band-pass filter 32 removes unwanted harmonic frequencies, and a limiter 33 limits the amplitude of the down modulated RF signal. A demodulator block 34 demodulates the direct-sequence spread spectrum (DSSS) signal, and feeds a digital signal to a data input of the digital back-end chip 35 containing the digital signal processor (DSP) 36.

Similar to this, the digital signal processor (DSP) 36 outputs a data stream to a modulator 22 where the data stream is modulated according the Bluetooth protocol. The modulator 22 receives a clock signal from the Phase Locked Loop 30, and delivers an output signal to a Power Amplification stage 12, which applifies the modulated signal to be transmitted via the antenna 25.

The digital signal processor 36 is connected to a memory 37, preferably an EEPROM (Electrically Erasable Programmable Read-Only Memory) memory, which is used to store general chipset configuration parameters and individual user profile data. The EEPROM memory 37 is a non-volatile memory used to store small amounts of data that must be saved when power is removed.

The individual user profile data stored in the EEPROM memory 37 may identify the user and the hearing aid itself. Furthermore the actual hearing loss recorded in a session at an audiologist or the hearing aid gain settings for compensating the hearing loss may be stored in the EEPROM memory 37. The audio spectrum will typically be divided into multiple frequency bands—e.g. 5-10, and the hearing aid gain is set individually for each of these bands.

Hearing Loss Compensation

The digital signal processor 36 processes the incoming audio signal by means of algorithms embedded in the silicon. To some extent, the algorithms may be controlled by settings stored in the EEPROM memory 37. The core operation of the digital signal processor 36 is to split the incoming audio signal into a plurality of frequency bands, and a gain compensation for the hearing loss measured by the audiologist is applied in each of these frequency bands. WO2007112737 A1 describes how the fitting session when setting the parameters is handled. This operation is performed by a hearing loss compensation algorithm 61 (see FIG. 3).

For severe hearing losses, where the hearing ability in certain frequency bands has been completely lost, the digital signal processor 36 may transpose and optionally compress, the audio available in these bands into typically lower bands where the hearing aid user actually does have some residual ability to hear. WO2007025569A1 describes a hearing aid with compression in multiple bands. This operation is performed by a transposition or compression algorithm 62 (see FIG. 3).

The assignee, Widex A/S of Lynge, Denmark, also offers hearing aids featuring a transposer capability, named Audibility Extender™, using linear frequency transposition, which means that digital signal processor 36 moves one section of frequencies to a lower range of frequencies without compressing or distorting the signal. Hereby, the important harmonic relationship of sound is preserved which again means that a sound source like a bird will continue to sound like a bird. This operation is performed by an audibility extender algorithm 63 (see FIG. 3).

The digital signal processor 36 also benefits from the communication between the two hearing aids normally used. By analyzing the sounds received and their relative timing, the digital signal processor 36 may via the signal processing turn the set of hearing aids into a directional microphone system, HD Locator™, and thereby filter out background noise. This operation is performed by an HD Locator algorithm 64 (see FIG. 3).

The assignee, Widex A/S of Lynge, Denmark, also offers a harmonic tone generation program, Zen™, designed for relaxation and concentration and for making tinnitus less noticeable. The digital signal processor 36 plays random tones that never repeat themselves, and can be adjusted according to user needs and preferences. Settings will be stored in the EEPROM memory 37. This operation is performed by a Zen algorithm 65 (see FIG. 3).

The digital signal processor 36 may also perform e.g. adaptive feedback cancellation and wind noise reduction. These operations are performed by an adaptive feedback cancellation algorithm 66 and a wind-noise cancellation algorithm 67, respectively (see FIG. 3). When getting a new hearing aid and new functionality, a user may be overwhelmed by the sound he hears using e.g. transposition algorithms. Therefor the hearing aid may advantageously include acclimatization for slowly phasing in the new functionality, in order that the user over several weeks gradually becomes used to the new hearing capabilities.

The hearing aid may in addition to this have several modes or programs for setting sound sources, or parameters for the different algorithms. These may include:

| Hearing aid modes | |
|---|---|
| M | Master - Dedicated to optimizing speech in everyday listening situations |
| MT | Combination Microphone and Telecoil |
| T | Telecoil alone |
| Mus | Music program - Omnidirectional without using noise reduction algorithms |
| Z | Tinnitus relief - Including a harmonic tone generation program designed for relaxation and concentration and for making tinnitus less noticeable |
| S | Stream audio from external device |

When the digital signal processor 36 has completed the amplification and noise reduction, the frequency bands on which the signal processing has taken place are combined, and a digital output signal is output to an output transducer (speaker) 39 via a ΔΣ-output stage 38 of the back-end chip 35. Hereby the output transducers make up part of the electrical output stage, essentially being driven as a class D digital output amplifier.

According to the first embodiment of the invention, the digital back-end chip 35 includes a User Interface (UI) component 40 monitoring for control signals received via the RF path. The control signals received are used to control the modes or programs in which the digital signal processor 36 operates. In addition to the normal control signals from an external device operating as remote control, the external device may also provide a control signal indicating that the external device will now start streaming an audio signal that has already been amplified, compressed and conditioned in the external device. Then the digital signal processor 36 by-passes the audio-improving algorithms and transfers the streamed audio signal directly to the output stage 38 for presentation of the audio signal via the output transducer (speaker) 39. This mode is then used until the external device instructs something else or the connection with the external device has been lost for a predetermined period.

Figure 3:
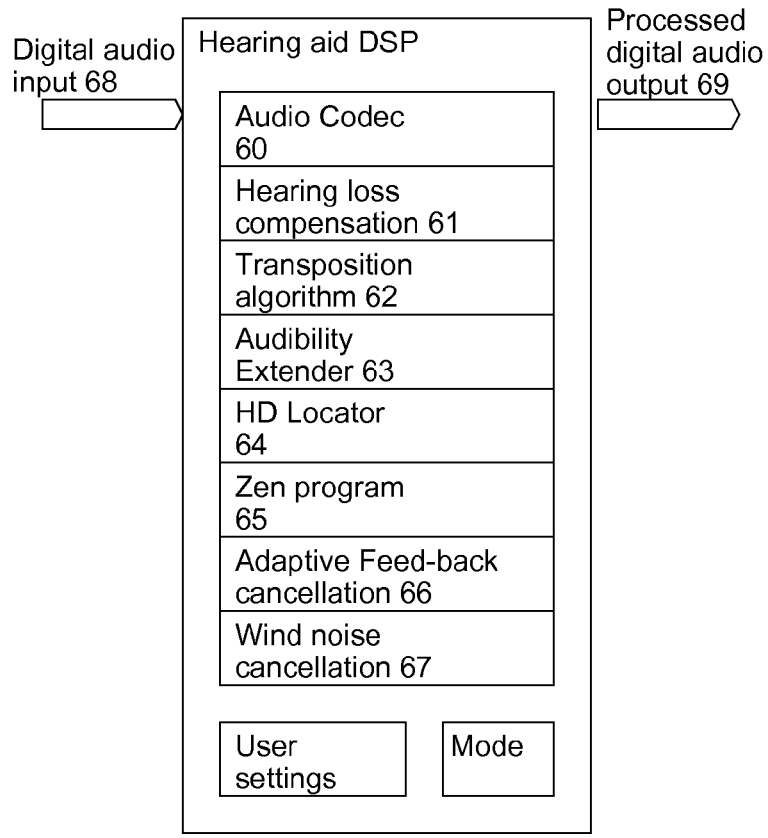
FIG. 3 illustrates schematically a presentation of the hearing aid algorithms employed in a first embodiment of a hearing aid according to the invention.

Reference is made to FIG. 3, where a schematic presentation of the first embodiment of the digital signal processing unit 36 of the hearing aid 10 is shown. The digital signal processing unit 36 receives as input 68 a digital audio signal and delivers as output 69 an amplified, compressed and conditioned digital audio output signal. In this, the digital signal processing unit 36 selectively applies a plurality of algorithms on the digital audio signal. The plurality of algorithms selectively applied by the digital signal processing unit 36 are controlled by the current mode of the hearing aid 10 and by the user setting set by an audiologist during fitting of the hearing aid 10. The user settings as well as the current mode are stored in the EEPROM memory 37.

The digital signal processing unit 36 employs the decoder of audio codec 60 to decode an audio signal received from the external device 50. The digital signal processor 36 employs the hearing loss compensation algorithm 61 to amplify an audio signal received from the microphones 11A, 11B, from the telecoil 15, or in the form of a "raw" streamed signal received from the external device 50. In case of a streamed signal that has already been amplified, compressed and conditioned, the digital processor 36 leads the audio signal from the decoder to the speaker 39 without further amplification, compression and conditioning. This may be done by bypassing the hearing loss compensation algorithm 61, or by setting the gain of the hearing loss compensation algorithm 61 to be 0 dB.

The digital signal processing unit 36 employs the transposition or compression algorithm 62 and the audibility extender algorithm 63 similar to the employment of the hearing loss compensation algorithm 61. The HD Locator algorithm 64, the adaptive feedback cancellation algorithm 66 and the wind-noise cancellation algorithm 67 all correct noise in the hearing aid caused by sound picked up by the microphones 11A, 11B, and therefore these algorithms are employed when processing an audio signal received from the microphones 11A, 11B. The Zen program is employed independent of audio sources, and the digital signal processing unit 36 will only employ the Zen algorithm 65 when the corresponding Zen mode is selected.

Figure 2:
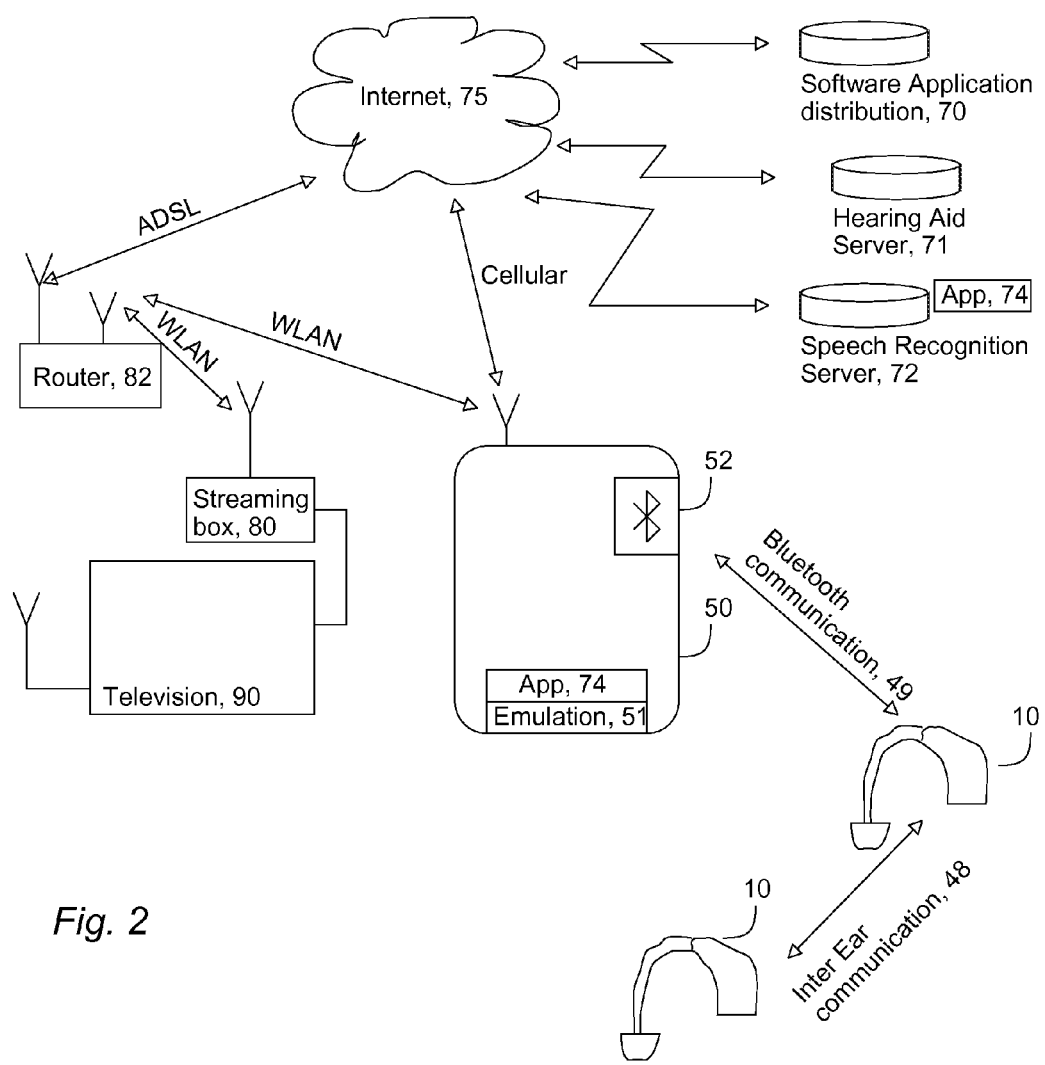
FIG. 2 illustrates schematically a scenario according to the invention in which a hearing aid is wirelessly connected to the Internet via en external device.

Reference is made to FIG. 2 illustrating a possible set up for a set of hearing aids 10 connected to an external device 50 via a wireless connection. The Bluetooth v4.0 (Bluetooth Low Energy) protocol allows point-to-multipoint data transfer with advanced power-save and secure encrypted connections. Therefore, the external device 50 could communicate with the two hearing aids 10 in a multiplexed set-up, but during audio streaming according to the first embodiment, the external device 50 communicates with a first one of the two hearing aids 10 via a wireless connection 49 based on the Bluetooth v4.0 protocol. For this purpose, the external device 50 has a Bluetooth transceiver 52. The two hearing aids 10 may communicate via a proprietary communication protocol, or via a protocol as explained in WO-A1-99/43185, no further explanation is needed. The first hearing aid 10 receiving the Bluetooth signal from the external device 50 forwards (acts as transponder) the signal by means of a communication protocol to the second hearing aid 10. The two hearing aids 10 are hardware-wise identical apart from being adapted to fit into the left and right ear of the user, respectively, and programmed differently. One of two hearing aids 10 is appointed as transponder, and this may take place in a fitting session or when the external device 50 is mated with one of the hearing aids 10.

The invention has so far been described with reference to a direct link between the hearing aid 10 and the external device 50, but a man skilled in the art would know that a converter device could be employed in between.

Inter-ear communication 48 between the two hearing aids 10 takes place in a per se known manner, involves per se known means, and will not be explained further.

The data stream in the Bluetooth connection 49 will include address data addressing the appropriate recipient, control data to be recognized by the User Interface component 40 of the hearing aid, and audio data encoded by an encoder in a codec 51. The control data may inform the hearing aid whether the audio stream is one-way or two-way (duplex), the nature of the audio signal—e.g. a "raw" or a signal that has already been amplified, compressed and conditioned in the external device 50. In case the signal already has been amplified, compressed and conditioned, the digital processor 36 leads the audio signal from the decoder to the speaker 39 without further amplification, compression and conditioning. Even though the major part of the amplification, compression and conditioning has taken place in hearing aid emulation performed in the external device 50, it may be desired to have amplitude control and Automatic Gain Control (AGC) to avoid clipping and to correct for acoustic frequency dependent limitations. This may be for compensating for the acoustic characteristics of the sound pipe of the hearing aid, etc. In case the signal is "raw", the digital processor 36 processes the audio signal according to the current mode of the hearing aid 10 and the user settings stored in the EEPROM memory 37.

The external device 50 may preferably be a smartphone, but the invention may also be embodied in an external device 50 being a tablet computer or even a laptop. What is important is that the external device 50 is provided with connectivity towards the hearing aids 10 and the Internet, and that the external device 50 has sufficient memory to store a hearing aid emulation program, and processing power being sufficient to run the hearing aid emulation program in a way so an audio signal may be amplified, compressed and conditioned in the external device 50, and with a limited delay transferred to the hearing aids 10. The mentioned device offers high-speed data access provided by Wi-Fi and Mobile Broadband.

The hearing aid 10 needs to have Bluetooth enabled. Normally, Bluetooth will be disabled for the hearing aid 10, as there is no need for wasting power searching for a connection, when the user has not paired the hearing aid 10 and the Bluetooth device 50. According to a first embodiment, the user enables Bluetooth on his external device 50, e.g. his smartphone. Then he switches on his hearing aid 10, which will enable Bluetooth for a period. This period may be five minutes or shorter. Advantageously this period may be just one minute, but extended to two minutes if the hearing aid 10 detects a Bluetooth device in its vicinity. During this period the hearing aid will search for Bluetooth devices, and when one is found, the hearing aid sends a security code to the device in a notification message, and when the user keys in the security code, the connection is established and the external device 50 may from now on work as remote control for the hearing aid, stream audio from sources controlled by the external device 50, or update hearing aid settings from the Internet and controlled by the external device 50. The security requirements are fulfilled as every time the hearing aid 10 is switched on afterwards, it will keep Bluetooth switched on, and react when the external device 50 communicates.

In an alternative embodiment, the hearing aid 10 and the external device 50 are both equipped with NFC (Near Field Communication) readers 41, 42, and an ad hoc Bluetooth connection is provided by bringing the hearing aid 10 and the external device 50 closely together in a so-called "magic touch". Hereafter, the external device 50 will work as remote control for the hearing aid, including audio streaming and remote fitting (updating hearing aid settings from a remote server). This state continues until the state is discontinued from the external device 50 acting as remote control, or until the hearing aid is switched off by removing the battery.

Hearing Aid Emulator

Figure 4:
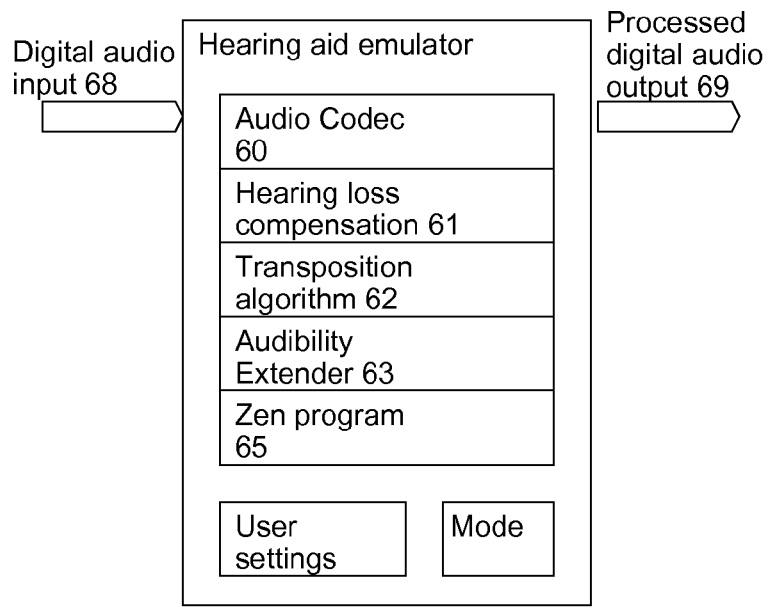
FIG. 4 illustrates schematically a presentation of the hearing aid algorithms employed in an emulator used in a first embodiment of an external device according to the invention.

FIG. 4 shows schematically a presentation of the hearing aid algorithms employed in an emulator used in a first embodiment of an external device 50 according to the invention. The hearing aid emulation software product 74 is software that when run on the external device 50 duplicates (or emulates) the functions of the hearing aid algorithms with regard to amplifying, compressing and conditioning the digital audio signal in the hearing aid 10 so that the emulated behavior closely resembles the behavior of the real hearing aid system. Preferably the hearing aid emulation software product 74 is specific for the hearing aid manufacturer. The focus is on exact replication of the performance, as the user shall not be able to note a difference compared to the situation where the amplifying, compressing and conditioning took place in the hearing aid 10.

The hearing aid emulation software product 74 is run by the processor of the external device 50, and the processed signal is transmitted to the hearing aid 10 together with appropriate control signals via the Bluetooth transceiver 52. The results achieved by using the algorithms 60-67 provided in silicon are the same as when using the emulation software. The actual software codes will of course be different.

The hearing aid emulation software product 74 employs an audio codec 160 when receiving an audio signal from a sound source, for example a cellular phone call handled by the external device 50 (smartphone) itself, an IP telephony call or a chat session handled by the external device 50 (tablet/laptop/smartphone) itself, Television sound received from an audio plug-in device 80 on the television 90 and transmitted to the external device 50 via a router 82 supporting WLAN, or music from a music player session (MP3, Youtube, or music streaming over the Internet, Internet radio or the like) handled by the external device 50 (tablet/laptop/smartphone) itself.

The hearing aid emulation software product 74 employs a transposition algorithm 162 and the audibility extender algorithm 163 in a way similar to the general hearing loss compensation algorithm 61 for amplifying, compressing and conditioning the digital audio signal for the hearing aid 10. The hearing aid emulation software product 74 may beneficially include a Zen program that is employed independently of audio sources. A Zen algorithm 165 will only be active when the Zen mode is selected.

Figure 5:
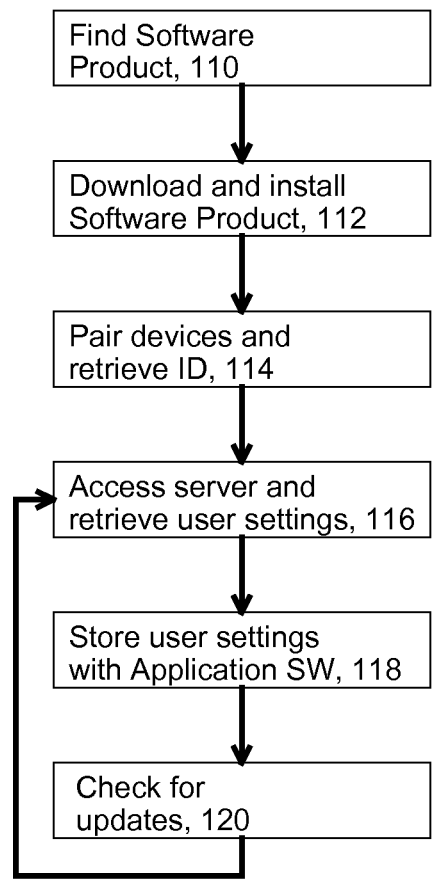
FIG. 5 is a flow diagram for setting up an emulator software application on an external device according to an embodiment of the invention.

Reference is now made to FIG. 5 showing a flow diagram for setting up an emulator software application on an external device 50 according to the invention. The external device 50 may be a smartphone, and an owner of a hearing aid 10 accesses a digital distribution platform 72 via the Internet 75, and when the hearing aid emulation software product 74 is found in step 110, the user may download a hearing aid emulation software product 74 according to the invention in step 112.

Once the hearing aid emulation software product 74 has been downloaded and installed, the user may pair the hearing aid 10 and the external device 50 in step 114 as described above. When pairing the hearing aid 10 and the external device 50, the hearing aid 10 transfers the hearing aid ID stored in the EEPROM 37. This hearing aid ID may advantageously include manufacturer, model and serial number of the hearing aid. The audiologist stores data in a server 71 when fitting a hearing aid 10. These data include the serial number of the hearing aid 10, the hearing aid model, and the actual settings of the hearing aid—number of bands, gain settings for the individual band, programs available, acclimatization parameters, and details about the hearing aid user. When the external device 50 has retrieved the hearing aid ID, the external device 50 accesses at step 116 the server 71 via the Internet 75 and retrieves the setting required ensuring that the behavior of the hearing aid emulation software product 74 closely resembles the behavior of the real hearing aid system 10. These settings are stored in step 118 in the hearing aid emulation software product 74 of the external device 50, and the external device 50 may in step 120 hereafter regularly check the digital distribution platform 72 and the hearing aid server 71 for updates.

In an alternative embodiment, the external device 50 may retrieve the settings, required for ensuring that the behavior of the hearing aid emulation software product 74 closely resembles the behavior of the real hearing aid system 10, directly from the hearing aid 10 itself.

In order to obtain good speech intelligibility, the speech must of course be sufficiently loud, and the speech sound must be distinct from background noise. Furthermore, simultaneous components of speech (spoken syllables including consonant sounds and vowel sounds) shall maintain relative properties. Finally, successive sounds of rapidly moving articulation shall be clear and distinct from each other. It is a well-known challenge that people may have idiosyncratic speech artifacts—including varying speech patterns—and such artifacts make the speech intelligibility difficult—even for those having normal hearing.

It is not always sufficient to amplify, compress and condition the speech, as any inherent idiosyncratic speech artifacts and/or noise from a noisy environment will remain in the audio signal outputted to the user. Therefor there may be a need for synthesizing a new speech signal that may be friendlier to the hearing impaired listener. When having an audio stream of a certain duration and complexity, it makes sense to implement a Speech Recognition Engine in a server 70 accessible via the Internet 75. The calculation power is significantly better in a server compared to a handheld device. A company, Vlingo Inc, has have developed such an Speech Recognition Engine for voice control of handheld devices, wherein the user speaks to his smartphone, which via a thin client sends the voice to the server, and gets back a text string. As the Speech Recognition Engine over time learns the speaker's voice, it will be able to handle the inherent idiosyncratic speech artifacts and create a rather robust transcription of the spoken sound. There may be a short delay, but compared to poor understanding due to the inherent idiosyncratic speech, the speech synthesis will be a landmark improvement. The server 70 will stream a text string to the external device 50 via the Internet 75 and the cellular connection or the ADSL/WLAN connection.

Text-To-Speech Synthesis

Figure 6:
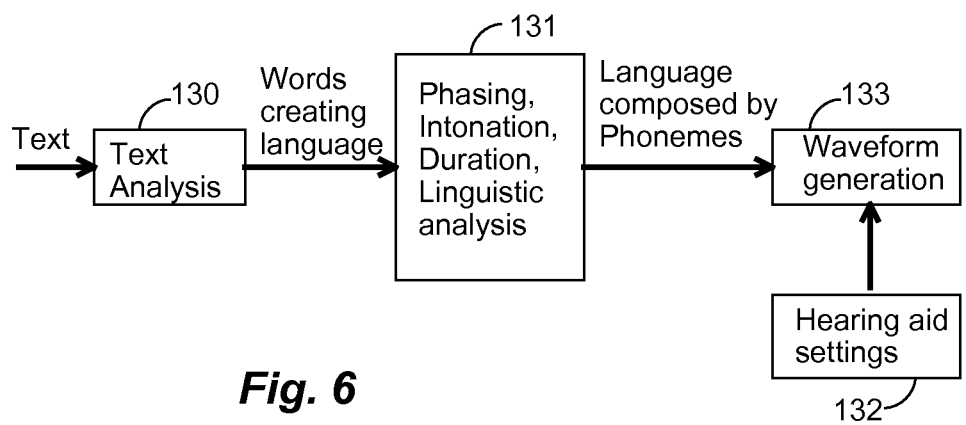
FIG. 6 illustrates schematically a text-to-speech engine used in a external device according to an embodiment of the invention.

In a second embodiment, the external device 50 includes a text-to-speech engine as shown in FIG. 6. Such a text-to-speech engine is well known in the art as these devices are widely used in navigation devices and smartphones supporting GPS navigation—such a device may be a Nokia N8. The text-to-speech engine will normally be implemented as software, and it may be retrieved as an add-on to the hearing aid emulation software product 74. The text-to-speech engine synthesizes speech by concatenating fragments of recorded speech stored in a database in the memory of the external device 50, and what is important for this second embodiment is that the fragments of recorded speech have been processed according to the hearing loss of the user by using linear frequency transposition (moving one section of the frequencies to a lower range of frequencies without compressing the signal and retaining the important harmonic relationship of sounds) and by applying a frequency dependent gain compensating for the hearing loss of the user.

Sounds below the frequency where the hearing loss becomes significant are amplified based on the individual's degree of hearing loss at those frequencies. Transposition moves sounds from the source region to a "target" region immediately below the frequency where the hearing loss becomes significant. The transposed sounds are mixed with the original sounds and receive amplification appropriate for the frequency. What is important is that speech intelligibility of the synthetized audio signal is improved compared to an ordinary amplified human speech signal.

On the input side of the text-to-speech engine, a string of ASCII characters is received by a text analyzing unit 130, which divides the raw text into sentences and converts the raw text containing symbols like numbers and abbreviations into the equivalent of written-out words. This text preprocessing process is often called text normalization or tokenization. A linguistic analyzing unit 131 assigns phonetic transcriptions (text-to-phoneme or grapheme-to-phoneme conversion) to each word, and divides and marks the text into prosodic units, like phrases, and clauses. The symbolic linguistic representation—including phonetic transcriptions and prosody information—is outputted by the linguistic analyzing unit 131 and fed to a waveform generator 133.

The waveform generator 133 synthesizes speech by concatenating the pieces of recorded speech that are stored in a database in the memory of the external device 50.

Alternatively, the waveform generator 133 includes the computation of the target prosody (pitch contour, phoneme durations), which is then imposed on the output speech. Normally, the quality of a speech synthesizer is judged by its similarity to the human voice but according to the invention the speech synthesizer shall be judged by its ability to improve speech intelligibility. Finally the synthesized speech is transferred to the hearing aid 10 via the Bluetooth connection, and as the audio signal already is amplified, compressed and conditioned, the hearing aid 10 just plays the signal for the user without additional processing.

Similar to the text string received from the Speech Recognition Engine, subtitles may be grabbed from films, television programs, video games, and the like, usually displayed at the bottom of the screem—but here used as an input text stream for the text-to-speech engine. Television subtitles (teletext) are often hidden unless requested by the viewer from a menu or by selecting the relevant teletext page.

Telephone conversation may be assisted by the remote Speech Recognition Engine, but when having a dialogue it is desired to have a very low delay of the synthesized speech as collisions of speech and long pauses will distract the speech.

The hearing aid 10 is controlled by the user by means of the external device 50. When opening the App 74, the user can see that the hearing aid 10 is connected to the external device 50. Furthermore he can choose some menues as "control hearing aid" which includes volume control and mode selection. Further he may choose stream audio sources—but this requires that e.g. television audio streaming has been set up. Telephone calls, radio and music player is inherent in the external device 50 and does not require additional set-up actions. Issues with annoying sound in the hearing aid may be fixed by reporting the issue to the server 71 together with answering a questionnaire and then getting a fix in return. Finally the menu includes a set-up item where new audio sources may be connected for later use.

We claim:

1. A system for improving speech intelligibility of an audio signal, comprising: a hearing aid, an external device and a server, wherein said hearing aid includes a speaker to output said audio signal into an ear of a user, and a short range transceiver; said server is accessible via the Internet and includes a Speech Recognition Engine converting a speech stream into a text string; and said external device includes:
a short range transceiver for communication with said hearing aid,
a second transceiver for providing a wireless data connection to said server via the Internet,
a Text-To-Speech engine adapted to synthesize speech based on a string of text;
means for selectively streaming a speech stream intended for the hearing aid to said server via said second transceiver for conversion by said Speech Recognition Engine into a string of text,
means for receiving said string of text from said server via said second transceiver, and for providing said string of text as input to said Text-To-Speech engine, and
means for forwarding the synthetized speech signal to said hearing aid via said short range transceiver.

2. The system according to claim 1, wherein the Text-To-Speech engine of the external device synthesizes an audio stream according to the hearing loss of the user by applying a frequency dependent gain compensating for the hearing loss of the user.

3. The system according to claim 1, wherein the Text-To-Speech engine of the external device synthesizes an audio stream according to the hearing loss of the user by applying linear frequency transposition.

4. The system according to claim 1, wherein the external device includes a memory in which settings for compensating the hearing loss of the user are stored.

5. The system according to claim 1, wherein the short range transceiver is adapted to set up data connection using a Bluetooth Low Energy protocol.

6. The system according to claim 1, wherein said speech stream is responsive to an output of a microphone included in said hearing aid.

7. An external device for use with a hearing aid and an internet server in a system for improving speech intelligibility of an audio signal to be output into an ear of a user by means of a speaker of the hearing aid, and comprising:
a short range transceiver for communication with said hearing aid,
a second transceiver for providing a wireless data connection to a server having a Speech Recognition Engine converting speech into text,
a Text-To-Speech engine adapted to synthesize speech based on a string of text,
means for forwarding the synthesized speech signal to said hearing aid via said short range transceiver,
said second transceiver being adapted for selectively streaming a speech stream intended for the hearing aid to said server for conversion into a string of text by said Speech Recognition Engine, and
said second transceiver being adapted to receive said string of text, and to provide said string of text as input to said Text-To-Speech engine.

8. The external device according to claim 7, wherein the Text-To-Speech engine of the external device synthesizes an audio stream according to the hearing loss of the user by applying a frequency dependent gain compensating for the hearing loss of the user.

9. The external device according to claim 7, wherein the Text-To-Speech engine of the external device synthesizes an audio stream according to the hearing loss of the user by applying linear frequency transposition.

10. The external device according to claim 7, including a memory in which settings for compensating the hearing loss of the user are stored.

11. The external device according to claim 7, wherein the short range transceiver is adapted to set up data connection using a Bluetooth Low Energy protocol.

12. The external device according to claim 7, wherein said speech stream is responsive to an output of a microphone included in said hearing aid.

13. A method for improving speech intelligibility of an audio signal, and comprising the steps of:
   selectively streaming, from said external device to a remote server via a wireless connection, a speech stream intended for thea hearing aid, said remote server being accessible via the Internet and having a Speech Recognition engine for converting said speech stream into a string of text,
   receiving said string of text at said external device via said wireless connection,
   providing said string of text as input to a Text-To-Speech engine in said external device which synthesizes s speech signal based on said string of text, and
   forwarding the synthesized speech signal to said hearing aid via said short range transceiver.

14. The method according to claim 13, wherein the Text-To-Speech engine of the external device synthesizes an audio stream according to the hearing loss of the user by applying a frequency dependent gain compensating for the hearing loss of the user.

15. The method according to claim 13, wherein the Text-To-Speech engine of the external device synthesizes an audio stream according to the hearing loss of the user by applying linear frequency transposition.

16. The method according to claim 13, wherein said speech stream is responsive to an output of a microphone included in said hearing aid.

17. A non-transitory computer-readable storage medium having computer-executable instructions, which when executed in a mobile communication device perform the following actions when an audio stream is handled as input in said mobile communication device and intended for thea hearing aid:
   providing a software application including a Text-To-Speech engine,
   selectively streaming a speech stream intended for the hearing aid via a wireless connection of said mobile communication device to a remote server having a Speech Recognition engine for converting said speech stream into a string of text and returning the string of text to the mobile communication device,
   receiving said string of text at said mobile communication device via said wireless connection,
   synthesizing a speech signal based on said string of text in said Text-To-Speech engine, and
   forwarding the synthesized speech signal to said hearing aid via said short range transceiver.

18. The computer-readable storage medium according to claim 17, wherein the Text-To-Speech engine of the external device synthesizes an audio stream according to the hearing loss of the user by applying a frequency dependent gain compensating for the hearing loss of the user.

19. The computer-readable storage medium according to claim 17, wherein the Text-To-Speech engine of the external device synthesizes an audio stream according to the hearing loss of the user by applying linear frequency transposition.

20. The system according to claim 1, wherein said speech stream is responsive to an output of a telecoil included in said hearing aid.

* * * * *